United States Patent
De Pasca

(10) Patent No.: US 8,072,179 B2
(45) Date of Patent: Dec. 6, 2011

(54) ELECTRONIC STARTER DEVICE FOR AN ELECTRIC MOTOR, IN PARTICULAR FOR A COMPRESSOR OF A REFRIGERATING CIRCUIT OF AN ELECTRIC HOUSEHOLD APPLIANCE

(75) Inventor: Alfredo De Pasca, Cavaria Con Premezzo (IT)

(73) Assignee: ITW Industrial Components S.R.L. Con Unico Socio, Milan (IT)

( * ) Notice: Subject to any disclaimer, the term of this patent is extended or adjusted under 35 U.S.C. 154(b) by 339 days.

(21) Appl. No.: 12/374,198

(22) PCT Filed: Sep. 28, 2007

(86) PCT No.: PCT/IB2007/002856
§ 371 (c)(1),
(2), (4) Date: Jan. 16, 2009

(87) PCT Pub. No.: WO2008/038125
PCT Pub. Date: Apr. 3, 2008

(65) Prior Publication Data
US 2010/0013426 A1    Jan. 21, 2010

(30) Foreign Application Priority Data

Sep. 29, 2006   (IT) ................ TO2006A0703

(51) Int. Cl.
*H02P 1/26*   (2006.01)
*H02P 1/28*   (2006.01)
(52) U.S. Cl. ................ 318/781; 318/786; 361/23
(58) Field of Classification Search .......... 320/17
See application file for complete search history.

(56) References Cited

U.S. PATENT DOCUMENTS

| 4,605,888 A |   | 8/1986 | Kim |   |
| 4,651,077 A |   | 3/1987 | Woyski |   |
| 5,051,681 A | * | 9/1991 | Schwarz | 318/786 |
| 5,302,885 A | * | 4/1994 | Schwarz et al. | 318/781 |
| 2004/0263109 A1 |   | 12/2004 | Schwarz |   |
| 2005/0007062 A1 |   | 1/2005 | Mehlhorn |   |
| 2006/0273752 A1 | * | 12/2006 | Duarte et al. | 318/791 |

FOREIGN PATENT DOCUMENTS

| DE | 260590 A1 | 9/1988 |
| WO | 2006001601 A1 | 1/2006 |

OTHER PUBLICATIONS

ISR for PCT/IB2007/002856 dated Jun. 5, 2008.

* cited by examiner

*Primary Examiner* — Bentsu Ro
*Assistant Examiner* — Jorge Carrasquillo
(74) *Attorney, Agent, or Firm* — Lowe Hauptman Ham & Berner LLP

(57) ABSTRACT

An electronic starter device for an electric motor including a first terminal connected in use to a mains voltage source selectively activatable by means of control means to feed respective starter and run windings of the electric motor; switch means arranged in series between the voltage source and the starter winding to selectively feed the starter winding; generating means of a first low voltage potential (V1) directly connected to the feeding terminal; timer means including at least one capacitor and means for selectively charging the capacitor by means of at least one first resistor; first driving means for activating the switch means; and second driving means for activating the first driving means, the latter being arranged logically in a cascade with respect to the second driving means, which are activated by means of the timer means.

14 Claims, 1 Drawing Sheet

ELECTRONIC STARTER DEVICE FOR AN ELECTRIC MOTOR, IN PARTICULAR FOR A COMPRESSOR OF A REFRIGERATING CIRCUIT OF AN ELECTRIC HOUSEHOLD APPLIANCE

RELATED APPLICATIONS

The present application is based on International Application Number PCT/IB2007/002856 filed Sep. 28, 2007, and claims priority from, Italian Application Number TO2006A000703, filed Sep. 29, 2006, the disclosures of which are hereby incorporated by reference herein in their entirety.

TECHNICAL FIELD

The present invention relates to an electronic starter device for an electric motor, in particular for a compressor of a refrigerating circuit of an electric household appliance.

BACKGROUND ART

It is known from EP-A-1327776 an electronic starter device for an electric motor of a compressor of a household appliance, in the case in point a refrigerator or a freezer, in which a switch for supplying the starter winding is electronically controlled by a heat-sensitive element operatively connected to the switch; the heat-sensitive element is a thermistor or a PTC tablet and the switch comprises a TRIAC.

Such a starter device, in addition to being relatively complex and expensive, determines a relatively high energy consumption even after the motor has started, equal to approximately 1-1.5 watts, a consumption which is lower than the energy consumption of traditional starter devices based on heat-sensitive elements only, but still is not satisfactory.

EP 1045510B1 relates to an electronic starter device for an electric motor of a refrigerator compressor, in which a first and a second circuit branch, each of which is equipped with a resistor, a capacitor and a diode, are fed at AC to generate pulses having decreasing amplitude in time, which are used by means of amplifiers comprising two MOS transistors for driving the transistors themselves, such transistors both being operatively connected to switch means for supplying the electric motor starter winding, such a switch means being constituted by a TRIAC.

During the positive mains half-wave, the capacitor of the first branch is charged by means of the corresponding resistance and, by means of the diode, supplies to a first transistor the signal needed to bring the same to a conducting state, needed in turn by the latter to supply the TRIAC with the current needed to drive the motor starter winding. In the subsequent negative half-wave, the same process is activated in the second branch, supplying to a second transistor the signal needed to bring it to a conducting state and to continue to supply the necessary current to the TRIAC. When the two capacitors have reached the maximum charge voltage, the flow of current terminates and the TRIAC, by switching off, shuts down the feeding of the compressor motor starter winding. Resistors arranged in parallel on the capacitors of the two branches ensure that at the next start-up, the two capacitors are discharged and ready to be charged again.

Neither is the above-described solution of EP 1045510B1 entirely satisfactory. Indeed, although on one hand such solution allows to obtain nearly zero energy consumption when the motor starter winding is not fed, on the other hand, the resulting electronic circuit is relatively complex and expensive to make, requires components not commonly used in consumable electronic circuits, needs a relatively cumbersome electronic board for its implementation and may be difficult to calibrate.

DISCLOSURE OF INVENTION

It is the object of the present invention to solve the aforesaid drawbacks by providing an electronic starter device for an electric motor, typically a compressor for electric household appliances, such as the one equipping the refrigerating circuits of refrigerators and freezers, which is simple, reliable and low-cost, easy to calibrate and which may be implemented on a small-sized electronic board, while ensuring a negligible, although not zero, energy consumption during the normal operation of the electric motor.

The present invention thus relates to an electronic starter device for an electric motor, in particular for a compressor of a refrigerating circuit of an electric household appliance, as defined in claim 1.

In particular, the starter device according to the invention comprises a first terminal connected in use to a mains voltage source selectively activatable by means of control means (e.g. the control thermostat of the refrigerating circuit) to feed respective starter and run windings of the electric motor; switch means arranged in series between the voltage source and the starter winding to selectively feed the starter winding; timer means comprising at least one capacitor and means for selectively charging the capacitor; first driving means for activating the switch means; at least one first resistor by means of which said means for charging the capacitor operate; and second driving means for activating the first driving means, the latter being arranged logically in a cascade with respect to the second driving means.

The second driving means are activated by means of the timer means and generating means of a first low voltage potential directly connected to the first terminal and, on opposite band, to a reference potential (to ground) are further present.

The capacitor is connected in a cascade to, and upstream of, the first and second driving means and, by means of a second terminal, to the first low voltage potential and, on opposite band, to the reference potential by means of the first resistor; whereas the first and second driving means are connected to the reference potential by means of at least one second resistor.

According to an aspect of the invention, the means for charging the capacitor comprise a first electric circuit branch by means of which the capacitor is connected to the second driving means and along which there are arranged in series at least one third resistor and at least one first diode, which is a Zener diode having as activation voltage a second low voltage potential, the absolute value of which is lower than that of the first low voltage potential; and the first and second driving means consist of a first and a second transistor, preferably of the NPN type, whereas the switch means are selected from the group consisting of: TRIAC, relay, SCR, MOSFET; and preferably consist of a TRIAC.

In this manner, a resulting circuit with the following performances is obtained:
small size of the electronic board needed to implement it;
relatively low costs and high manufacturing and assembly simplicity, entirely utilising components of common use in any electronic circuit and thus of the general-purpose type;

the type of compressor controlled by the circuit is irrelevant for the operation of the circuit itself, thus a single circuit may be used to control different compressors;

the energy consumption of the motor starter circuit in normal operating conditions in close to zero (less than 0.2 watts) and is zero when the motor is static, i.e. when, for example, the thermostat does not provide any feeding signal, the starter circuit being fed along with the compressor motor;

the capacitor charge is not directly used to drive the TRIAC, making the circuit easier to calibrate during the step of designing.

BRIEF DESCRIPTION OF THE DRAWINGS

Further features and advantages of the present invention will be apparent from the following description of two non-limitative embodiments, made with reference to the accompanying drawings, in which FIG. 1 diagrammatically shows a circuit implementing an electronic starter device for an electric motor, also diagrammatically shown.

BEST MODE FOR CARRYING OUT THE INVENTION

Figure 1:
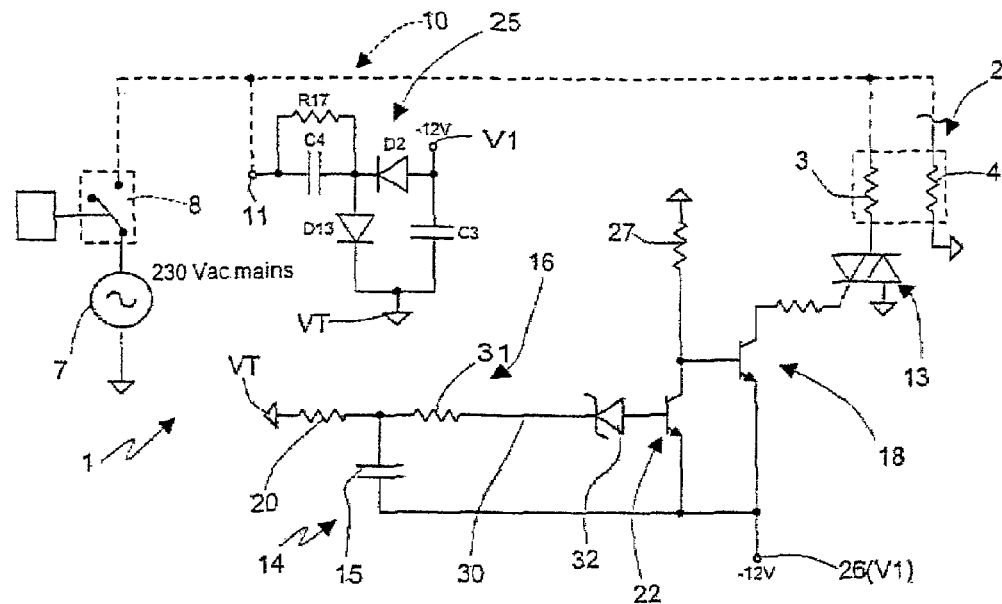

With reference to FIG. 1, numeral 1 indicates as a whole an electronic starter device 1 for an electric motor 2, which comprises respective starter 3 and run 4 windings (known), which are fed by a mains voltage source 7 selectively activable by means of control means 8 (known), e.g. consisting, in the case of a motor 2 operating a compressor of a refrigerating circuit of a refrigerator, of a thermostat of any known type, either electronic or electro mechanical, so as to supply current to the windings 3 and 4 only when the thermostat 8 enables it, closing a respective feeding circuit 10 for the motor 2.

The feeding of the starter winding 3 is further controlled, according to a well-known general diagram, by the starter device 1, which has the task of supplying mains current to the starter winding 3 only during the initial step of supplying current to the motor 2 (the step of starting, indeed) for a predetermined time, to then leave the winding 3 unfed until the thermostat 8 reopens the feeding circuit 10 thus stopping the motor 2; at that point, the device 1 must be capable of resuming the feeding of the winding 3 as soon as the thermostat 8 closes the feeding circuit 10 again, e.g. following the raising of the temperature inside the refrigerator.

According to the invention, the starter device 1 is of the type comprising a first terminal 11 connected in use to the mains voltage source 7, in particular connected in derivation to feeding circuit 10 of the motor 2, to that, according to an aspect of the invention, the feeding of the device 1 by the source 7 is activated and deactivated by means of the control means 8 at the same time as the motor 2.

The device 1 further comprises switch means 13 arranged in series between the voltage source 7 and the starter winding 3 for selectively feeding the starter winding 3 for a predetermined period of time only, under the control of device 1; for such a purpose, the device 1 moreover comprises timer means 14, comprising in turn at least one capacitor 15 and means, indicated as a whole by numeral 16, for selectively charging the capacitor 15; furthermore, the switch means 13 are controlled, according to an essentially known arrangement, by first driving means 18 of the type adapted to selectively activate the switch means 13, driving means 18 which are controlled by the timer means 14, according to the invention, in an indirect manner.

For this purpose, the device 1 comprises at least one first resistor 20 by means of which the means 16 operate for charging the capacitor 15 and second driving means 22 for activating the first driving means 18, the latter being arranged logically in a cascade with respect to the second driving means 22.

"Logically in a cascade" hereinafter means that the activation or the deactivation of the driving devices 18 is controlled by the activation or deactivation of the driving means 22.

In the case in point, the second driving means 22 are directly activated by means of the timer means 14, as explained below.

The device 1 according to the invention finally comprises generating means 25 of a first negative low voltage potential V1, e.g. a value of −12 V in direct current, directly connected to the first terminal 11, from which they receive the mains voltage with the thermostat 8 activated, and on opposite band, to a reference potential VT consisting of a connection to ground.

Furthermore, according to a further aspect of the invention, the capacitor 15 is connected in a cascade to, and upstream of, first and second driving means 18 and 22, respectively, and, by means of a second terminal 26, to the first low voltage potential V1 and, on opposite band, to the reference potential VT. In particular, the capacitor 15 is connected to the reference potential VT by means of the first resistor 20, while the first driving means 18 and the second driving means 22 are connected to the reference potential VT by means of at least one second resistor 27.

The means 16 for charging the capacitor 15 comprise a first electric circuit branch 30 by means of which the capacitor 15 is connected, in the case in point with a positive armature plate thereof, to the second driving means 22 and along which there are arranged in series at least one third resistor 31 and at least one first diode 32, which is a Zener diode having as activating voltage, a second low voltage potential of absolute value lower than that of the potential V1 as.

According to a preferred aspect of the invention, the first and the second driving means consist, respectively, of a first transistor 18 and of a second transistor 22, both preferably of the NPN type; and the switch means 13 is selected from the group consisting of: TRIAC, relay, SCR, MOSFET. Preferably, the switch means used in the device 1 according to the invention consists of a TRIAC 13.

The device 1 according to the invention therefore consists of an electronic circuit which may be implemented on a common board entirely using standard components of current use, in which the first driving means constituted by the transistor 18, and the second driving means constituted by the transistor 22, and the capacitor 15 are connected so that, when the mains voltage source 7 is activated by the control means 8, the first transistor 18 is immediately set to a conducting state determining the concurrent activation of the switch means consisting of the TRIAC 13 and, consequently, the feeding of the starter winding 3 of the electric motor 2 by the mains voltage source 7; while, simultaneously, the capacitor 15 is charged at progressively higher voltages by means of the first resistor 20, in virtue of the fact that the second transistor 22 is in an interdiction state.

Furthermore, the electric connections between the described components are such that when the voltage at the terminals of the capacitor 15 reaches a predetermined threshold value (e.g. 3.6 V), a value determined by the dimensioning of the means 16 for charging the capacitor 15, the second transistor 22 is set to a conduction state thus determining the passage of the first transistor 18 to an interdiction state, with consequent deactivation of the switch means 13 and termination of the feeding of said starter winding 3 of the electric motor 2.

Furthermore, it is also apparent from the foregoing description that the electric connections between the components of the device 1, in particular between the capacitor 15, the second driving means 22 and the circuit branch 30 constituting, with its components 31 and 32, the means 16 for charging the capacitor 15, are such that, when the mains voltage source 7 is deactivated by the control means 8, not only is all feeding to the windings 3 and 4 ceased, regardless of the state of the TRIAC 13, but at the same time the condenser 15, if in a charged state, e.g. after concluding a starting cycle of the motor 2, is allowed to discharge to the reference potential VT by means of said first resistor 20, i.e. the same by means of which the capacitor 15 also receives the charge.

From the foregoing description, it is apparent that the operation of the device 1 shown in FIG. 1 is as follows:

The generating means 25, which in the example shown are constituted by a group of components C4, R17, D13, D2, C3, form a −12V feeding stage. The mains voltage is applied to the capacitor C4 and is rectified by means of the diodes D13 and D2. The capacitor C3 performs a levelling function of the voltage thus obtained (−12V).

The group of components 20, 15, 31, 32, 18, 22, 27 form a timer stage, in the case in point set to a time of 1 second. The initially discharged capacitor 15 starts charging by means of the resistors 20 because during this step the transistor 22 is not conducting, while the transistor 18, which by means of a resistor R3 activates the TRIAC 13, is conducting. When the voltage at the terminals of the capacitor 15 reaches the value of approximately 3.6 V, established by the dimensioning of the Zener diode 32, the transistor 22 starts conducting, while transistor 18 is set to interdiction thus deactivating the TRIAC 13, which activates/deactivates the compressor starter winding 3.

Figure 2:
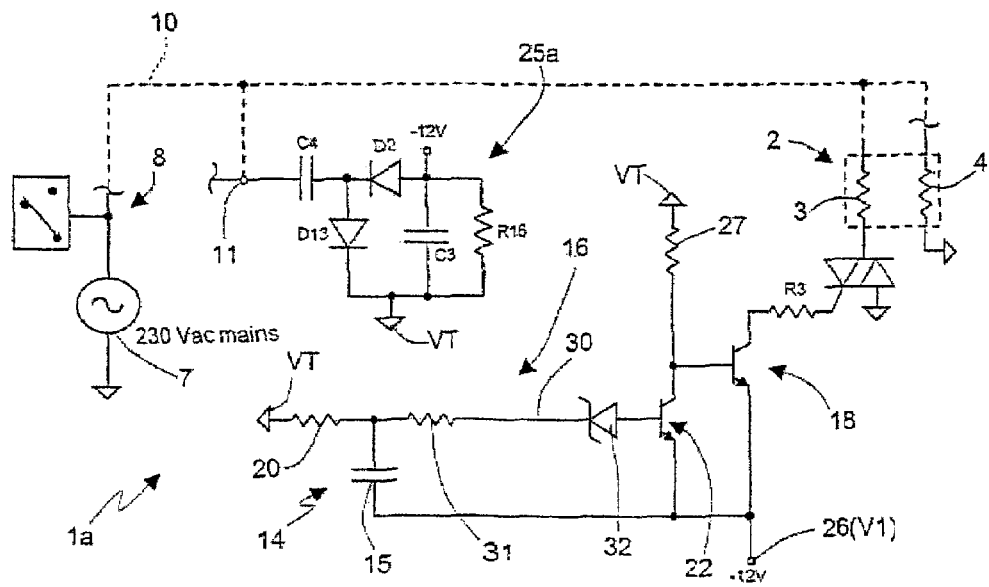
FIG. 2 shows a possible variant of the circuit in FIG. 1.

FIG. 2, in which either similar or identical details to those previously described are indicated with the same numerals for the sake of simplicity, shows a variant la of the previously described device 1, differing therefrom only for the elements embodying generating means 25a of the first low voltage potential V1.

In this case, the −12V feeding stage 25a is formed by a group of components C4, R18, D13, D2, C3, in which the resistor R18 has replaced the previously used resistor R17 and is found in a different position, in parallel on the capacitor C3 instead of in parallel on the capacitor C4, as shown in FIG. 1.

It is however apparent to a person skilled in the art that many other variant embodiments of the described device may be made, also circuitly very different from the illustrated embodiments, but always using standard components and the same architecture underlying the teachings of the invention.

The invention claimed is:

1. An electronic starter device for an electric motor, the device comprising:
    a first terminal;
    a controller for selectively connecting a mains voltage source to the first terminal, to feed a starter winding and a run windings winding of the electric motor;
    a switch for selectively feeding the starter winding, the switch being arranged in series on a feeding path from the mains voltage source to the starter winding;
    a timer comprising:
        at least one first capacitor; and
        a capacitor charging circuit for selectively charging the at least one first capacitor;
    a first driver for activating the switch;
    at least one first resistor for operating the capacitor charging circuit;
    a second driver for activating said first driver, the first driver being arranged logically in a cascade with respect to the second driver, wherein said second driver is activated said timer; and
    a generator for feeding a first low voltage potential, the generator being directly connected to said first terminal and, on opposite side, to a reference potential.

2. The device according to claim 1, wherein said at least one first capacitor is connected in a cascade to and upstream of said first and second drivers, said at least one first capacitor being connected to receive said first low voltage potential through a second terminal and, on opposite side, to said reference potential.

3. The device according to claim 2, wherein said at least one first capacitor is connected to receive said reference potential through said at least one first resistor, said first and second drivers being connected to receive the reference potential through at least one second resistor.

4. The device according to claim 2, wherein said capacitor charging circuit comprises:
    a first branch of electric circuit,
        wherein said at least one first capacitor is connected to said second driver through the first branch, and
        wherein at least one third resistor and at least one first diode are arranged in series along the first branch.

5. The device according to claim 4, wherein said at least one first diode is a Zener diode having a second low voltage potential as an activation voltage, an absolute value of the second low voltage potential being lower than the first low voltage potential.

6. The device according to claim 1, wherein said first low voltage potential is a negative potential.

7. The device according to claim 1, wherein said first and second drivers include a first transistor and a second transistor, respectively.

8. The device according to claim 7, wherein said first and second drivers and the at least one first capacitor are connected
    so that, when said mains voltage source is connected to the first terminal by said controller, said first transistor is set to a conduction state determining the activation of said switch and consequently the feeding of said starter winding by said mains voltage source, and while, said first transistor is in the conduction state said at least one first capacitor is charged by said at least one first resistor when said second transistor is in a cut-off state, until a voltage at terminals of said at least one first capacitor reaches a predetermined threshold determined by said capacitor charging circuit; and
    so that, when said predetermined threshold is reached, said second transistor is set to a conduction state thus determining a passage of the first transistor to a cut-off state, with a consequent deactivation of the switch and a termination of the feeding of said starter winding.

9. The device according to claim 7, wherein each of the first transistor and the second transistor is of an NPN type.

10. The device according to claim 8, wherein said at least one first capacitor, said capacitor charging circuit, and said second driver are connected so that, when said mains voltage source is disconnected from the first terminal by said controller, said at least one first capacitor, if the at least one first capacitor is in a charged status, is discharged to a reference potential by said at least one first resistor.

11. The device according to claim 1, wherein said switch is selected from the group consisting of a TRIAC (TRiode for Alternating Current), a relay, a SCR (Silicon Controlled Rectifier), and a MOSFET.

12. The device according to claim 1, wherein the switch is a TRIAC (TRiode for Alternating Current).

13. The device according to claim 1, wherein the generator comprises:
 a second diode having an anode connected to a node where the first low voltage potential is to be fed;
 a third diode having an anode connected to a cathode of the second diode and having a cathode connected to receive the reference potential;
 a second capacitor connected between the node and the cathode of the third diode;
 a third capacitor connected between the cathode of the second diode and the first terminal; and
 a fourth resistor connected in parallel with the third capacitor.

14. The device according to claim 1, wherein the generator comprises:
 a second diode having an anode connected to a node where the first low voltage potential is to be fed;
 a third diode having an anode connected to a cathode of the second diode and having a cathode connected to receive the reference potential;
 a second capacitor connected between the node and the cathode of the third diode;
 a third capacitor connected between the cathode of the second diode and the first terminal; and
 a fourth resistor connected in parallel with the second capacitor.

* * * * *